United States Patent
Ogasahara

(10) Patent No.: US 9,215,354 B2
(45) Date of Patent: Dec. 15, 2015

(54) IMAGE PROCESSING METHOD AND SOLID-STATE IMAGING DEVICE HAVING A NOISE REDUCTION FILTER

(71) Applicant: Kabushiki Kaisha Toshiba, Tokyo (JP)

(72) Inventor: Takayuki Ogasahara, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 16 days.

(21) Appl. No.: 13/760,232

(22) Filed: Feb. 6, 2013

(65) Prior Publication Data

US 2013/0201371 A1    Aug. 8, 2013

(30) Foreign Application Priority Data

Feb. 7, 2012    (JP) .................................. 2012-023902

(51) Int. Cl.
| | | |
|---|---|---|
| *H04N 5/217* | (2011.01) | |
| *H04N 5/21* | (2006.01) | |
| *G06T 5/00* | (2006.01) | |
| *H04N 5/357* | (2011.01) | |

(52) U.S. Cl.
CPC ........... *H04N 5/21* (2013.01); *G06T 5/002* (2013.01); *H04N 5/217* (2013.01); *H04N 5/3572* (2013.01)

(58) Field of Classification Search
CPC ....... H04N 5/217; H04N 5/21; H04N 5/3572; H04N 9/045; G06T 5/002
USPC ............................ 348/241, 294, 607; 382/261
See application file for complete search history.

(56) References Cited

U.S. PATENT DOCUMENTS

| | | |
|---|---|---|
| 2005/0206966 A1 | 9/2005 | Kakumitsu |
| 2009/0041371 A1* | 2/2009 | Hasegawa ..................... 382/261 |
| 2009/0052798 A1 | 2/2009 | Kwon et al. |
| 2009/0129695 A1* | 5/2009 | Aldrich et al. ................ 382/261 |
| 2011/0019035 A1 | 1/2011 | Satodate |
| 2011/0205404 A1 | 8/2011 | Tamura et al. |

FOREIGN PATENT DOCUMENTS

| | | |
|---|---|---|
| JP | 2-222376 | 9/1990 |
| JP | 2000-23173 | 1/2000 |
| JP | 2005-269373 | 9/2005 |
| JP | 2006-60744 | 3/2006 |
| JP | 2008-258909 | 10/2008 |
| JP | 2011-29722 | 2/2011 |
| WO | WO2010/058497 | 5/2010 |

OTHER PUBLICATIONS

Japanese Office Action with English translation, mailed on Mar. 17, 2015 in Japanese Patent Application No. 2012-023902, citing documents AA, AB, AC, AO, and AP therein (5 pages).

* cited by examiner

*Primary Examiner* — Antoinette Spinks
(74) *Attorney, Agent, or Firm* — Oblon, McClelland, Maier & Neustadt, L.L.P.

(57) ABSTRACT

According to one embodiment, a noise reduction circuit includes a noise reduction filter for converting a pixel value of a pixel of interest through a calculation that uses the pixel value of the pixel of interest and pixel values of adjacent pixels. The noise reduction filter is set, for the calculation, with a heavier weighting for vertically adjacent pixels than that for horizontally adjacent pixels. The horizontally adjacent pixels are adjacent pixels that are located in parallel with the pixel of interest in a horizontal direction. The vertically adjacent pixels are adjacent pixels that are located in parallel with the pixel of interest in a vertical direction.

12 Claims, 5 Drawing Sheets

FIG.3

| a11 | a12 | a13 | a14 | a15 |
|-----|-----|-----|-----|-----|
| a21 | a22 | a23 | a24 | a25 |
| a31 | a32 | a33 | a34 | a35 |
| a41 | a42 | a43 | a44 | a45 |
| a51 | a52 | a53 | a54 | a55 |

FIG.4

| 0% | 0% | 100% | 0% | 0% |
|----|----|------|----|----|
| 0% | 0% | 100% | 0% | 0% |
| 0% | 0% | 100% | 0% | 0% |
| 0% | 0% | 100% | 0% | 0% |
| 0% | 0% | 100% | 0% | 0% |

FIG.5

| 0% | 0% | 25% | 0% | 0% |
|---|---|---|---|---|
| 0% | 25% | 50% | 25% | 0% |
| 25% | 50% | 100% | 50% | 25% |
| 0% | 25% | 50% | 25% | 0% |
| 0% | 0% | 25% | 0% | 0% |

FIG.6

| 0% | 0% | 10% | 0% | 0% |
|---|---|---|---|---|
| 0% | 0% | 50% | 0% | 0% |
| 0% | 0% | 100% | 0% | 0% |
| 0% | 0% | 50% | 0% | 0% |
| 0% | 0% | 10% | 0% | 0% |

| 0% | 25% | 100% | 25% | 0% |
| 0% | 25% | 100% | 25% | 0% |
| 0% | 25% | 100% | 25% | 0% |
| 0% | 25% | 100% | 25% | 0% |
| 0% | 25% | 100% | 25% | 0% |

FIG.9

| 0% | 0% | 25% | 0% | 0% |
|---|---|---|---|---|
| 0% | 0% | 75% | 0% | 0% |
| 0% | 0% | 100% | 0% | 0% |
| 0% | 0% | 75% | 0% | 0% |
| 0% | 0% | 25% | 0% | 0% |

IMAGE PROCESSING METHOD AND SOLID-STATE IMAGING DEVICE HAVING A NOISE REDUCTION FILTER

CROSS-REFERENCE TO RELATED APPLICATIONS

This application is based upon and claims the benefit of priority from Japanese Patent Application No. 2012-023902, filed on Feb. 7, 2012; the entire contents of all of which are incorporated herein by reference.

FIELD

Embodiments described herein relate generally to an image processing device, an image processing method, and a solid-state imaging device.

BACKGROUND

Solid-state imaging devices including a noise reduction circuit for reducing noise such as random noise in digital images have been traditionally known. In many cases, a noise reduction circuit uses a correlation between a pixel of interest to be subjected to noise reduction processing and adjacent pixels located around the pixel of interest to calculate a pixel value of the pixel of interest. A noise reduction circuit sometimes acts to smooth pixel values of a radio frequency component contained in a subject image. Hence, a degradation of a feeling of resolution of an image is in some cases caused by the noise reduction processing, which has been a problem.

BRIEF DESCRIPTION OF THE DRAWINGS

FIG. 3 is a diagram of a matrix of weighting factors that are set for a noise reduction filter;

FIG. 4 is a diagram of an exemplary noise reduction filter in the first embodiment;

FIG. 5 is a diagram of an exemplary noise reduction filter in a comparative example of the first embodiment;

FIG. 6 is a diagram of an exemplary variation of the noise reduction filter;

FIG. 9 is a diagram of an exemplary noise reduction filter that has been adjusted by a filter strength adjusting unit.

DETAILED DESCRIPTION

According to one embodiment, an image processing device includes a noise reduction circuit. The noise reduction circuit performs noise reduction processing on an image signal obtained by imaging a subject image. The noise reduction circuit includes a noise reduction filter. The noise reduction filter is a filter for converting a pixel value of a pixel of interest through a calculation that uses the pixel value of the pixel of interest and pixel values of adjacent pixels. The adjacent pixels are pixels included in a pixel block having the pixel of interest at a center. The noise reduction filter is set, for the calculation, with a heavier weighting for vertically adjacent pixels than that for horizontally adjacent pixels. The horizontally adjacent pixels are adjacent pixels that are located in parallel with the pixel of interest in a horizontal direction. The vertically adjacent pixels are adjacent pixels that are located in parallel with the pixel of interest in a vertical direction.

Exemplary embodiments of an image processing device, an image processing method, and a solid-state imaging device will be explained below in detail with reference to the accompanying drawings. The present invention is not limited to the following embodiments.

Figure 1:
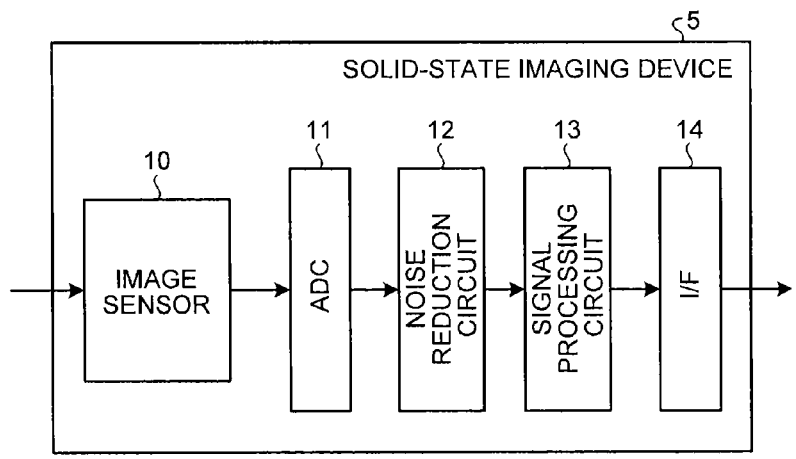
FIG. 1 is a block diagram of a schematic configuration of a solid-state imaging device according to a first embodiment.
Figure 2:
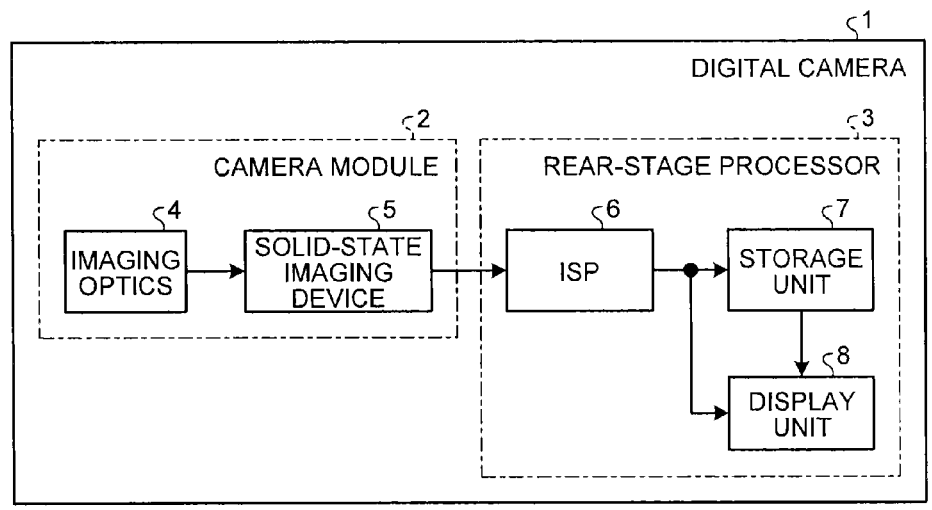
FIG. 2 is a block diagram of a schematic configuration of a digital camera including the solid-state imaging device illustrated in FIG. 1.

FIG. 1 is a block diagram of a schematic configuration of the solid-state imaging device according to the first embodiment. FIG. 2 is a block diagram of a schematic configuration of a digital camera including the solid-state imaging device illustrated in FIG. 1.

A digital camera 1 includes a camera module 2 and a rear-stage processor 3. The camera module 2 includes imaging optics 4 and a solid-state imaging device 5. The rear-stage processor 3 includes an image signal processor (ISP) 6, a storage unit 7, and a display unit 8. The camera module 2 is applied to, besides the digital camera 1, electronic equipment such as a portable terminal with an incorporated camera.

The imaging optics 4 receives light from a subject and forms a subject image. The solid-state imaging device 5 images the subject image. The ISP 6 performs signal processing on an image signal obtained by the imaging by the solid-state imaging device 5. The storage unit 7 stores the image that has undergone the signal processing at the ISP 6. The storage unit 7 outputs the image signal to the display unit 8 in conformity with a user operation or the like. The display unit 8 displays the image in conformity with the image signal received from the ISP 6 or the storage unit 7. The display unit 8 is, for example, a liquid crystal display.

The solid-state imaging device 5 is, for example, a CMOS (complementary metal oxide semiconductor) image sensor. The solid-state imaging device 5 may also be a CCD (charge coupled device) instead of a CMOS image sensor. The solid-state imaging device 5 includes an image sensor 10, an analog-to-digital converter (ADC) 11, a noise reduction circuit 12, a signal processing circuit 13, and an interface (I/F) 14.

The image sensor 10 converts the light received by the imaging optics 4 to a signal charge to image the subject image. The image sensor 10 generates an analog image signal by receiving a signal value of each color component, namely, red (R), green (G), and blue (B) in a sequence corresponding to a Bayer array. The ADC 11 converts the image signal from the image sensor 10 from an analog form to a digital form.

The noise reduction circuit 12 performs the noise reduction processing on the image signal from the ADC 11. The signal processing circuit 13 performs the signal processing on the image signal from the noise reduction circuit 12. The signal processing includes a defect correction, a shading correction, and a white balance adjustment. The noise reduction circuit 12 and the signal processing circuit 13 function as an image processing device that performs various kinds of image processing on a digital image signal from the ADC 11.

The I/F 14 outputs the image signal that has undergone the signal processing at the signal processing circuit 13. The I/F 14 may also convert a serial input to a parallel output, or convert a parallel input to a serial output.

The noise reduction circuit 12 applies the noise reduction filter to the noise reduction processing. The noise reduction filter is the filter for converting a pixel value of a pixel of interest through a calculation that uses the pixel value of the pixel of interest and pixel values of adjacent pixels. The pixel of interest is a target of the noise reduction processing. The adjacent pixels are located around the pixel of interest. The adjacent pixels are pixels included in a pixel block having the pixel of interest at a center.

The noise reduction filter obtains, for example, an average value of a pixel value of a pixel of interest and pixel values of predetermined adjacent pixels from an image signal input to the noise reduction circuit 12 to obtain a pixel value to be applied to the pixel of interest. In the noise reduction filter, a weighting factor is set for each pixel in a pixel block. The noise reduction circuit 12 calculates a weighted average in conformity with the weighting factors.

FIG. 3 is a diagram of a matrix of weighting factors set for the noise reduction filter. In the present embodiment, the adjacent pixels are pixels included in a 5-by-5 pixel block having a pixel of interest at the center. Each of factors a11 to a55 is a weighting factor to be applied to each pixel in the pixel block. A factor a33 is the weighting factor for the pixel of interest.

FIG. 4 is a diagram of an exemplary noise reduction filter in the first embodiment. FIG. 5 is a diagram of an exemplary noise reduction filter in a comparative example of the first embodiment. Each of the factors a11 to a55 is represented as a relative value to the factor a33 of the pixel of interest at 100%. Note that a value for each of the factors a11 to a55 can be changed as appropriate.

In the noise reduction filter illustrated in FIG. 5, each of the factors a11 to a55 is set such that the weighting becomes lighter as a pixel gets farther away from the pixel of interest in both the horizontal direction and the vertical direction. When such a noise reduction filter is used, the noise reduction processing is performed similarly for the horizontal direction and the vertical direction. The factors for the adjacent pixels in the horizontal direction and in the vertical direction are set such that a factor is reduced to 50%, then to 25%, as a pixel thereof gets farther away from the pixel of interest.

In contrast, the noise reduction filter of the present embodiment is set, for the calculation, with a heavier weighting for the vertically adjacent pixels than that for the horizontally adjacent pixels. The horizontally adjacent pixels are adjacent pixels that are located in parallel with the pixel of interest in the horizontal direction. The vertically adjacent pixels are adjacent pixels that are located in parallel with the pixel of interest in the vertical direction. This allows the noise reduction circuit 12 to perform smoothing processing with an increased involvement of the adjacent pixels in the vertical direction in comparison with the horizontal direction.

In the noise reduction filter of the present embodiment, each of the factors a11 to a55 is set such that the weighting is heavier in the vertical direction than that in the horizontal direction. In the noise reduction filter illustrated in FIG. 4, factors a13, a23, a43, and a53 for the vertically adjacent pixels among the adjacent pixels are set to 100%, and factors for the horizontally adjacent pixels and the other adjacent pixels are set to 0%. In this case, the noise reduction circuit 12 calculates an average value by adding the pixel value of the pixel of interest and the pixel values of the four vertically adjacent pixels and by excluding the pixel values of the other adjacent pixels from the addition.

In general, a subject to be imaged present in the natural world, in many cases, contains more frequency components in the horizontal direction than in the vertical direction. Human visual properties are considered to be more sensitive to a resolution feel in the horizontal direction than in the vertical direction. In comparison with noise reduction processing performed similarly for the horizontal direction and the vertical direction, the noise reduction circuit 12 of the present embodiment can restrain a degradation of the feeling of resolution by performing the noise reduction processing with the weighting set heavier in the vertical direction than in the horizontal direction. This allows the solid-state imaging device 5 to restrain a degradation of the feeling of resolution associated with the noise reduction processing, thereby obtaining a high quality image.

Figures 7, 8:
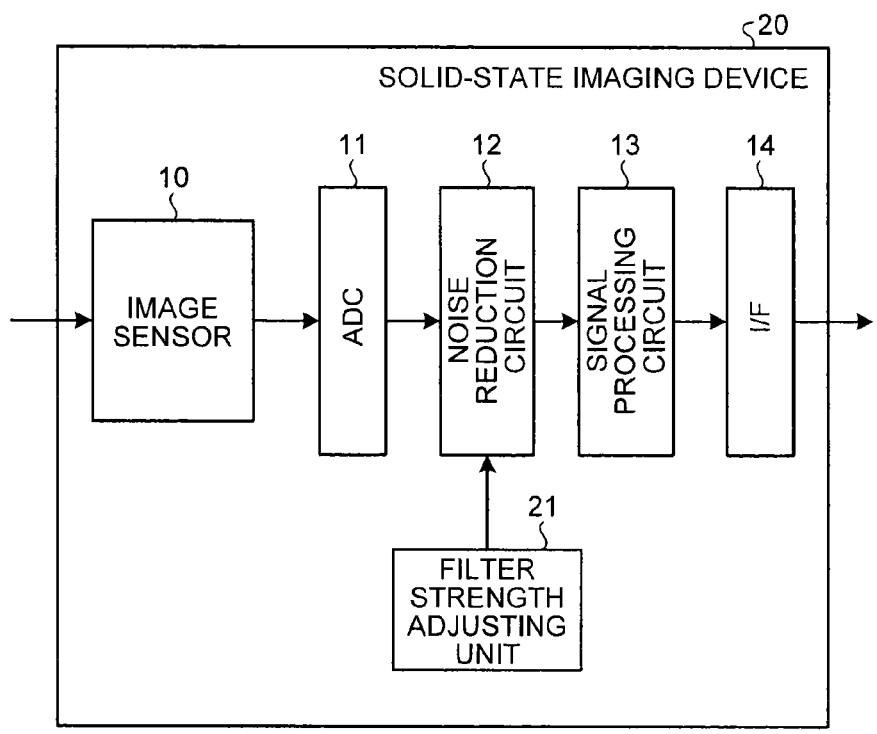
FIG. 7 is a diagram of another exemplary variation of the noise reduction filter.
FIG. 8 is a block diagram of a schematic configuration of a solid-state imaging device according to a second embodiment.

FIGS. 6 and 7 are diagrams of exemplary variations of the noise reduction filter. In a noise reduction filter illustrated in FIG. 6, the factors a13, a23, a43, and a53 for the vertically adjacent pixels are set such that a factor is reduced to 50%, then to 10%, as a pixel thereof gets farther away from the pixel of interest. Factors for the horizontally adjacent pixels and the other adjacent pixels are set to 0% similarly to those in the case of the noise reduction filter illustrated in FIG. 4.

When the noise reduction filter of this exemplary variation is used, the noise reduction circuit 12 can restrain a degradation of the feeling of resolution by performing the noise reduction processing with the weighting set heavier in the vertical direction than in the horizontal direction.

In the noise reduction filter illustrated in FIG. 7, the factors a13, a23, a43, and a53 for the vertically adjacent pixels are set to 100% similarly to the noise reduction filter illustrated in FIG. 4. In the noise reduction filter of this exemplary variation, furthermore, factors a12, a22, a32, a42, and a52 for pixels adjoining to the left of a column including the pixel of interest and the vertically adjacent pixels are set to 25%, and also, factors a14, a24, a34, a44, and a54 for pixels adjoining to the right of the column are set to 25%.

When the noise reduction filter of this exemplary variation is used, the noise reduction circuit 12 also performs the noise reduction processing with the weighting set heavier in the vertical direction than in the horizontal direction. This also allows the solid-state imaging device 5 to restrain a degradation of the feeling of resolution, when the noise reduction filter of this exemplary variation is used.

Here, the noise reduction circuit 12 may be any circuit as long as it performs the noise reduction processing with the weighting set heavier in the vertical direction than in the horizontal direction. For the noise reduction filter to be applied by the noise reduction circuit 12, a distribution and a value of the weighting by each of the factors a11 to a55 may be changed as appropriate.

FIG. 8 is a block diagram of a schematic configuration of a solid-state imaging device according to the second embodiment. The solid-state imaging device 20 according to the second embodiment, instead of the solid-state imaging device 5, is applied to the camera module 2 illustrated in FIG. 2. Like numerals are used to indicate like parts in the first embodiment, and common descriptions will not be repeated where appropriate.

The solid-state imaging device 20 according to the second embodiment includes the components included in the solid-state imaging device 5 illustrated in FIG. 1 and a filter strength adjusting unit 21. The filter strength adjusting unit 21 adjusts a filter strength of the noise reduction filter.

The filter strength adjusting unit 21 can adjust the filter strength in conformity with an optical property of the imaging optics 4 used for imaging of a subject image, for example, a lens property. A relative illumination, for example, is applied as the lens property. When the imaging is performed by the camera module 2, a quantity of light in some cases is reduced, in conformity with the lens property, at a periphery portion of an image in comparison with a center portion, which tends to cause noise.

The filter strength adjusting unit 21 refers to the lens property stored in advance as individual information in the camera module 2, and performs an adjustment to increase the filter strength in conformity with a reduction in the quantity of light at the periphery portion of the image. The camera module 2 stores this individual information, for example, in an OTP (one time programmable memory, not shown) of the solid-state imaging device 20.

Figure 9:
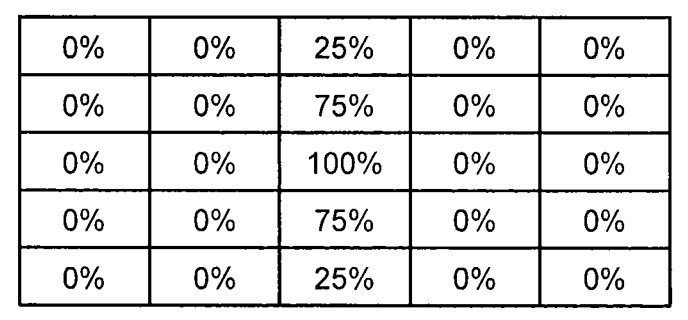

FIG. 9 is a diagram of an exemplary noise reduction filter that has been adjusted by the filter strength adjusting unit. In this example, the filter strength adjusting unit 21 applies the noise reduction filter illustrated in FIG. 6 to the center portion of the image. The filter strength adjusting unit 21 adjusts the filter strength of this noise reduction filter to obtain a noise reduction filter to be applied to the periphery portion of the image. Note that a value for each of the factors a11 to a55 can be changed as appropriate.

In the noise reduction filter illustrated in FIG. 6, the factors a13, a23, a43, and a53 for the vertically adjacent pixels are set to 10%, 50%, 50%, 10%, respectively. In contrast, in the adjusted noise reduction filter illustrated in FIG. 9, the factors a13, a23, a43, and a53 for the vertically adjacent pixels are set to 25%, 75%, 75%, 25%, respectively.

In this way, the filter strength adjusting unit 21 adjusts the filter strength of the noise reduction filter such that the weighting becomes heavier for the adjacent pixels in reference to the pixel of interest as the quantity of light is reduced at the periphery portion of the image. In the noise reduction filter used as a basis, each of the factors a11 to a55 is set such that the weighting is heavier in the vertical direction than that in the horizontal direction. In the noise reduction filter adjusted by the filter strength adjusting unit 21, each of the factors a11 to a55 is also set such that, for example, the weighting is heavier in the vertical direction than that in the horizontal direction. Here, the filter strength adjusting unit 21 may adjust the filter strength such that the weighting becomes more similar for the horizontal direction and the vertical direction as the quantity of light is reduced.

The noise reduction circuit 12 can perform the noise reduction processing in conformity with an optical property of the imaging optics 4 through the adjustment, by the filter strength adjusting unit 21, of the filter strength. The noise reduction circuit 12 can perform the noise reduction processing effectively for the entire image. This allows the solid-state imaging device 20 to restrain a degradation of the feeling of resolution associated with the noise reduction processing and to perform the noise reduction processing effectively for the entire image, thereby obtaining a high quality image.

The filter strength adjusting unit 21 may be able to adjust the filter strength in conformity with an illuminance present during the imaging of the subject image. The filter strength adjusting unit 21 predicts an illuminance present during the imaging of the subject image by, for example, referring to an analog gain used during the imaging. The filter strength adjusting unit 21 adjusts the filter strength of the noise reduction filter such that the weighting becomes heavier for the adjacent pixels in reference to the pixel of interest as the illuminance decreases.

In the noise reduction filter adjusted by the filter strength adjusting unit 21, each of the factors a11 to a55 is set such that, for example, the weighting is heavier in the vertical direction than that in the horizontal direction. Here, the filter strength adjusting unit 21 may adjust the filter strength such that the weighting becomes more similar for the horizontal direction and the vertical direction as the illuminance decreases.

In this case, the noise reduction circuit 12 can perform the noise reduction processing in conformity with an illuminance present during the imaging through the adjustment, by the filter strength adjusting unit 21, of the filter strength. The noise reduction circuit 12 can perform the noise reduction processing effectively in conformity with the illuminance present during the imaging. This allows the solid-state imaging device 20 to restrain a degradation of the feeling of resolution associated with the noise reduction processing and to perform the noise reduction processing effectively in conformity with the illuminance present during the imaging, thereby obtaining a high quality image.

The filter strength adjusting unit 21 may be any unit as long as it adjusts the filter strength in conformity with at least one of optical property of the imaging optics 4 and an illuminance present during the imaging. The filter strength adjusting unit 21 may adjust the filter strength in conformity with both an optical property of the imaging optics 4 and an illuminance present during the imaging.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method, comprising:
performing noise reduction processing on an image signal obtained by imaging of a subject image,
wherein in the noise reduction processing, a weighted average is calculated on a target of the noise reduction processing in conformity with factors set for a noise reduction filter,
the weighted average is an average of a pixel value of the target and pixel values of adjacent pixels,
the adjacent pixels are pixels included in a pixel block having the target at a center, the pixel block being a matrix composed of pixels,
in the noise reduction filter, the factors are set in advance for each pixel in the pixel block,
the factors set for pixels arranged in a horizontal direction in the pixel block are less with an increasing distance from a center in the horizontal direction,
the factors set for pixels arranged in a vertical direction in the pixel block are equal, and
the factors set for two or more columns are other than zero, each of the columns being pixels arranged in the vertical direction in the pixel block, one of the columns including the target.

2. The image processing method according to claim 1, further comprising adjusting a filter strength of the noise reduction filter,
wherein the filter strength is adjusted in conformity with an optical property of imaging optics used for the imaging of the subject image.

3. The image processing method according to claim 2, wherein the filter strength is adjusted, in conformity with the optical property that reduces a quantity of light at a periphery portion of an image in comparison with a center portion, such that weighting becomes heavier for the adjacent pixels in reference to the target as the quantity of light is reduced at the periphery portion.

4. The image processing method according to claim 1, further comprising adjusting a filter strength of the noise reduction filter, wherein the filter strength is adjusted in conformity with an illuminance present during the imaging of the subject image.

5. The image processing method according to claim 4, wherein the filter strength is adjusted such that weighting becomes heavier for the adjacent pixels in reference to the target as the illuminance decreases.

6. The image processing method according to claim 4, wherein the illuminance is estimated by referring to an analog gain used during the imaging of the subject image.

7. A solid-state imaging device, comprising:
an image sensor that images a subject image; and
a noise reduction circuit that performs noise reduction processing on an image signal obtained by the imaging of the subject image,
wherein the noise reduction circuit calculates, on a target of the noise reduction processing, a weighted average of a pixel value of the target and pixel values of adjacent pixels in conformity with factors set for a noise reduction filter,
the adjacent pixels are pixels included in a pixel block having the target at a center, the pixel block being a matrix composed of pixels,
in the noise reduction filter, the factors are set in advance for each pixel in the pixel block,
the factors set for pixels arranged in a horizontal direction in the pixel block are less with an increasing distance from a center in the horizontal direction,
the factors set for pixels arranged in a vertical direction in the pixel block are equal, and
the factors set for two or more columns are other than zero, each of the columns being pixels arranged in the vertical direction in the pixel block, one of the columns including the target.

8. The solid-state imaging device according to claim 7, further comprising a filter strength adjusting unit that adjusts a filter strength for the noise reduction filter,
wherein the filter strength adjusting unit adjusts the filter strength in conformity with an optical property of imaging optics used for the imaging of the subject image.

9. The solid-state imaging device according to claim 8, wherein, in conformity with the optical property that reduces a quantity of light at a periphery portion of an image in comparison with a center portion, the filter strength adjusting unit adjusts the filter strength such that weighting becomes heavier for the adjacent pixels in reference to the target as the quantity of light is reduced at the periphery portion.

10. The solid-state imaging device according to claim 7, further comprising a filter strength adjusting unit that adjusts a filter strength of the noise reduction filter,
wherein the filter strength adjusting unit adjusts the filter strength in conformity with an illuminance present during the imaging of the subject image.

11. The solid-state imaging device according to claim 10, wherein the filter strength adjusting unit adjusts the filter strength such that weighting becomes heavier for the adjacent pixels in reference to the target as the illuminance decreases.

12. The solid-state imaging device according to claim 10, wherein the filter strength adjusting unit estimates the illuminance by referring to an analog gain used during the imaging of the subject image.

* * * * *